April 4, 1967  T. D. LODE ETAL  3,312,188
SHOCK INDICATOR
Filed Aug. 16, 1965

INVENTORS
TENNY D. LODE
FRANK D. WERNER

United States Patent Office 3,312,188
Patented Apr. 4, 1967

3,312,188
SHOCK INDICATOR
Tenny D. Lode, Madison, Wis., and Frank D. Werner, Bloomington, Minn., assignors to Rosemount Engineering Company, Minneapolis, Minn., a corporation of Minnesota
Filed Aug. 16, 1965, Ser. No. 479,932
5 Claims. (Cl. 116—114)

This invention relates to the measurement of mechanical acceleration and shock. More particularly, it relates to instruments for determining if the magnitude of acceleration or shock has exceeded a predetermined level.

The possibility of damage due to excessive shock may be a significant problem in the shipment of heavy and/or delicate equipment. If shock measuring instruments are placed on or near the equipment being shipped, it may be possible to identify the time and place of excessive shock and/or likelihood of damage. If the equipment is damaged in shipment, measurement of the maximum shock encountered may aid in establishing the responsibility and liability for damage. If the equipment is received in an apparently undamaged state, and a high shock has been recorded, this will be an indication that the equipment should be carefully inspected for possible hidden damage. On the other hand, if no extreme shocks have been encountered during shipment, the likelihood of hidden damage will probably be quite small.

Many types of equipment, such as engineering instruments used in the field, aircraft equipment and laboratory instruments, are subject to possible hidden damage and/or shift of calibration due to excessive shock in the course of normal use. In such instances, it may be desirable to permanently attach one or more shock indicators to the equipment. If at any time a shock indicator has recorded an excessive shock, the equipment should be inspected for hidden damage and/or calibration shift. If the shock indicator shows that the equipment has not been subjected to excessive shock, this will give greater confidence that the equipment is operating correctly.

A variety of shock and acceleration measuring instruments have been devised for shipment monitoring and for other purposes. Some of the more elaborate instruments record acceleration in one, two or three dimensions on a moving paper chart. Simpler instruments simply indicate whether or not a predetermined maximum shock level has been exceeded. This specification is concerned primarily with the latter, simpler type of instrument.

This simple type of shock indicator is sometimes referred to as a yes-no shock indicator since it only indicates whether or not a particular shock level has been exceeded. If desired, two or more yes-no type shock indicators of different ranges may be placed together so as to indicate somewhat more precisely the maximum level of shock. This would provide an indication of whether the maximum experienced shock was low, moderate, high or extremely high.

Both resettable and non-resettable yes-no type shock indicators are known. One known resettable type uses a small ball which is magnetically held on a pedestal until a mechanical shock forces it off. Such a device is easily reset and has the advantage that it may be used over and over again for repeated shipments or other use. However, a disadvantage of the resettable type shock indicator is that it may possibly be reset by unauthorized personnel.

The non-resettable type instruments are usually designed so as to be permanently or irreversibly damaged by shock above a predetermined level. Since it can be used only until it has been tripped by a high shock, a non-resettable shock indicator should preferably be inexpensive. If desired, a non-resettable type shock indicator may be identified by a serial number or other marking making concealment or replacement of a tripped indicator extremely difficult. Non-resettable shock indicators have been built using the irreversible bending of a beam, the puncturing of a thin wall and other forms of mechanical failure to indicate excessive shock. A disadvantage of many types of such shock indicators is that the shock or acceleration level at which the mechanical failure takes place may not be accurately predictable and may have undesired variations with the direction of the shock.

An object of the present invention is to provide methods and means for the construction of shock and acceleration measuring instruments. Additional objects include: to allow the construction of yes-no type shock indicators of simple construction, high reliability and moderate cost; to allow the construction of shock indicators making use of highly predictable types of mechanical failure such as breaking of a line under tension and buckling of a column under compression; and to allow the construction of shock indicators having a relatively uniform sensitivity to shocks from various directions. Other objects and advantages of the present invention may be seen from the following specification and the drawings.

In a particular form of the present invention, a seismic mass is supported within a case by relatively sturdy vertical wires. Three constraint wires of uniform and known breaking strength extend horizontally from the seismic mass to the outer case in relative directions of 0°, 120° and 240°. As will be shown later, one or more of the horizontal constraint wires will break when the horizontal accelerating force on the seismic mass is approximately 93% of the breaking strength of an individual wire, regardless of the direction of the force in the horizontal plane. Other forms of the invention allow such measurements to be made in three dimensions and/or the resetting of the indicating instrument.

Figure 3:
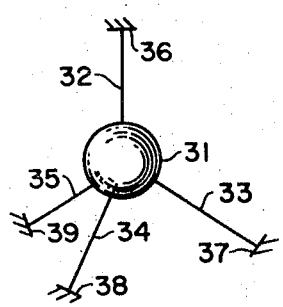
Figure 4:
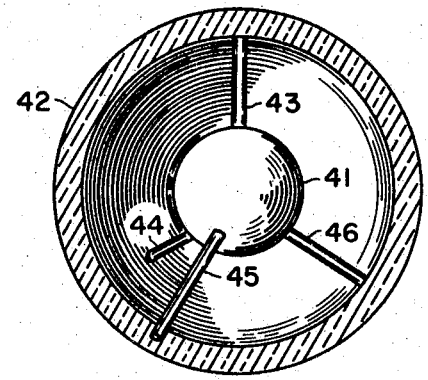

FIGURE 3 is a mechanical schematic representation and perspective view of a second form of the invention arranged for the measurement of shock or acceleration in three dimensions and employing support members which will fail under excessive tension; and FIGURE 4 is a perspective and section view of a third form of the invention arranged for the measurement of shock or acceleration in three dimensions and employing support columns which will fail under excessive compression.

Figure 1:
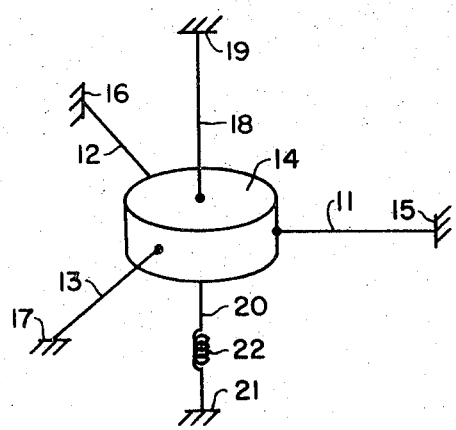
FIGURE 1 is a mechanical schematic representation and perspective view of a first form of the invention arranged for the measurement of shock or acceleration in a horizontal plane and employing support members which will fail under excessive tension.

Referring now to the drawings, FIGURE 1 includes wires 11, 12 and 13 all attached to seismic mass 14. Wire 11 extends from mass 14 to base point 15 where it is attached to an outer case or other surrounding mechanical structure. Wires 12 and 13 similarly extend from mass 14 to base points 16 and 17 respectively. Wire 18 extends from mass 14 upward to base point 19. Wire 20 extends from mass 14 downward to base point 21. Wire 20 includes spring element 22 for the purpose of maintaining an essentially constant tension in wire 20. Wires 11, 12 and 13 extend from mass 14 at essentially uniform angular intervals of 120° in the horizontal plane.

Figure 2:
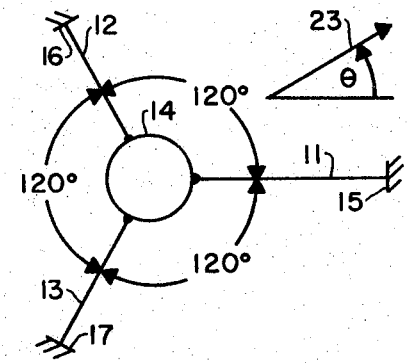
FIGURE 2 is a second view of the structure illustrated in FIGURE 1 as seen from above.

Reference is now made to FIGURE 2 which is a view of the structure shown in FIGURE 1 as seen from above. Wires 11, 12 and 13, seismic mass 14, and base points 15, 16 and 17 of FIGURE 2 are the same elements as shown in FIGURE 1. FIGURE 2 also includes force vector 23. The direction of vector 23 is indicated by the angle $\theta$ for convenience in subsequent description.

In analyzing the operation of the structure of FIGURES 1 and 2, it is assumed that vertical support wires 18 and 20 are sufficiently sturdy to resist breakage. Wires 11, 12 and 13 are assumed to be of equal and known breaking strengths. The initial tension in each of wires 11, 12 and 13 is assumed to be zero. That is, the tension will be zero in the absence of horizontal accelerating forces. The device will be "tripped" to indicate excessive acceleration or shock by breakage of one or more of wires 11, 12 and 13. If the horizontal accelerating force upon seismic mass 14 is in a direction of 60°, as defined by vector 23 and angle $\theta$, this force will be carried entirely by wire 13. Wire 13 may then be expected to break when the force exceeds its breaking strength. Similarly, a force upon mass 14 at 180° will be carried entirely by wire 11 and a force at 300° will be carried entirely by wire 12. For accelerating forces at these three specific angles, wire breakage will occur if, and only if, the magnitude of the accelerating force exceeds the breaking strength of the wires. However, we also wish to consider the effects of horizontal force components in other directions.

To analyze the effect of a horizontal force component at an arbitrary angle, we may initially consider a component for which $\theta$ is within the range $\pm 60°$ and later extend the results to the entire circle. With the force angle thus limited, the horizontal force component will be borne entirely by wires 12 and 13. We may resolve the horizontal forces into 0° and 90° components and make use of the fact that the sum of all forces upon mass 14 will be zero. Assuming a unit accelerating force applied to mass 14, $$F_0 = T_{12} \cos(120°) + T_{13} \cos(240°) + \cos\theta = 0$$

$$F_{90} = T_{12} \sin(120°) + T_{13} \sin(240°) + \sin\theta = 0$$

where $F_0$ and $F_{90}$ are the 0° and 90° force components, respectively, and $T_{12}$ and $T_{13}$ are the tensions of wires 12 and 13, respectively. Solving the above equations, $$T_{12} = \cos\theta - .577 \sin\theta$$

$$T_{13} = \cos\theta + .577 \sin\theta$$

As mentioned previously, the above formulas are valid only for forces directed at angles not exceeding $\pm 60°$. Within that range, the tension on wire 11 due to the accelerating force will be essentially zero. However, because of the obvious symmetry, the results may be easily extended to the entire circle. For example, the above formulas will give the tensions in wires 13 and 11 for force angles measured with respect to a 120° reference line and within $\pm 60°$ of the 120° reference line. Similarly, the formulas will give the tensions in wires 11 and 12 for angles measured with respect to and within 60° of a 240° reference line.

The calculated tension values for a unit force are listed in columns 2, 3 and 4 of Table 1 for 10° intervals

TABLE 1.—WIRE TENSIONS AND BREAKING FORCES FOR STRUCTURE OF FIGURES 1 AND 2

| $\theta°$ | $T_{11}$ | $T_{12}$ | $T_{13}$ | $T_{max}$ | Breaking Force |
|---|---|---|---|---|---|
| 0 | .000 | 1.000 | 1.000 | 1.000 | 1.000 |
| 10 | .000 | .885 | 1.085 | 1.085 | .922 |
| 20 | .000 | .742 | 1.137 | 1.137 | .879 |
| 30 | .000 | .577 | 1.155 | 1.155 | .866 |
| 40 | .000 | .395 | 1.137 | 1.137 | .879 |
| 50 | .000 | .201 | 1.085 | 1.085 | .922 |
| 60 | .000 | .000 | 1.000 | 1.000 | 1.000 |
| 70 | .201 | .000 | 1.085 | 1.085 | .922 |
| 80 | .395 | .000 | 1.137 | 1.137 | .879 |
| 90 | .577 | .000 | 1.155 | 1.155 | .866 |
| 100 | .742 | .000 | 1.137 | 1.137 | .879 |
| 110 | .885 | .000 | 1.085 | 1.085 | .932 |
| 120 | 1.000 | .000 | 1.000 | 1.000 | 1.000 |
| 130 | 1.085 | .000 | .885 | 1.085 | .922 |
| 140 | 1.137 | .000 | .742 | 1.137 | .879 |
| 150 | 1.155 | .000 | .577 | 1.155 | .866 |
| 160 | 1.137 | .000 | .395 | 1.137 | .879 |
| 170 | 1.085 | .000 | .201 | 1.085 | .922 |
| 180 | 1.000 | .000 | .000 | 1.000 | 1.000 |
| 190 | 1.085 | .201 | .000 | 1.085 | .922 |
| 200 | 1.137 | .395 | .000 | 1.137 | .879 |
| 210 | 1.155 | .577 | .000 | 1.155 | .866 |
| 220 | 1.137 | .742 | .000 | 1.137 | .879 |
| 230 | 1.085 | .885 | .000 | 1.085 | .922 |
| 240 | 1.000 | 1.000 | .000 | 1.000 | 1.000 |
| 250 | .885 | 1.085 | .000 | 1.085 | .922 |
| 260 | .742 | 1.137 | .000 | 1.137 | .879 |
| 270 | .577 | 1.155 | .000 | 1.155 | .866 |
| 280 | .395 | 1.137 | .000 | 1.137 | .879 |
| 290 | .201 | 1.085 | .000 | 1.085 | .922 |
| 300 | .000 | 1.000 | .000 | 1.000 | 1.000 |
| 310 | .000 | 1.085 | .201 | 1.085 | .922 |
| 320 | .000 | 1.137 | .395 | 1.137 | .879 |
| 330 | .000 | 1.155 | .577 | 1.155 | .866 |
| 340 | .000 | 1.137 | .742 | 1.137 | .879 |
| 350 | .000 | 1.085 | .885 | 1.085 | .922 |
| 360 | .000 | 1.000 | 1.000 | 1.000 | 1.000 | around the entire circle. The maximum of the three individual wire tensions is listed in column 5. It may be noted from Table 1 that the maximum tension due to a horizontal force component does not vary greatly with the direction of the applied horizontal force. The breakage of one or more individual support wires may be expected to take place at some particular maximum tension value. Hence, the reciprocal of the maximum tension gives the relative acceleration force value which will cause breakage of one or more horizontal support wires. This value is tabulated in the last column of Table 1. From this last column, it may be noted that the force required to break one or more horizontal constraint wires may be expressed as 93% ±7% of the wire breaking strength regardless of the horizontal direction. Thus, the structure of FIGURES 1 and 2 serves as a relatively simple detector of horizontal shock or acceleration in excess of a predetermined level regardless of the direction of the horizontal force component.

Reference is now made to FIGURE 3 which is a pictorial view of a second form of the invention arranged for the measurement of shock or acceleration in three dimensions. In FIGURE 3, seismic mass 31 is supported by constraint wires 32, 33, 34 and 35 which extend from mass 31 to base points 36, 37, 38 and 39, respectively. Base points 36, 37, 38 and 39 may be part of an outer case or other surrounding structure. The four constraint wires shown in FIGURE 3 extend outward in uniformly spaced directions. It may be noted that the angles between pairs of horizontal constraint wires in the structure of FIGURES 1 and 2 are equal, and in particular equal to 120°. The angles between pairs of constraint wires in the structure of FIGURE 3 will be similarly equal. These directions may also be defined as the points on a unit sphere which will contact the vertices of an inscribed regular tetrahedron. A calculation in solid geometry gives the angle between any two of the support wires shown in FIGURE 3 as arccos ($-\frac{1}{3}$) or 109.5°.

The structure of FIGURE 3 is an extension of the concept illustrated in FIGURES 1 and 2 to three dimensions. The four constraint wires shown in FIGURE 3 are assumed to be of uniform and known breaking strengths. Following the reasoning applied to the structure of FIG- URES 1 and 2, the magnitude of the shock or accelerating force upon mass 31 which is required to break one or more of the constraint wires will show only a moderate variation with the direction of the shock or acceleration. Thus, the structure of FIGURE 3 serves as a relatively simple detector of shock or acceleration of magnitude above a predetermined level regardless of the direction of the shock or acceleration.

Reference is now made to FIGURE 4 which illustrates a third form of the invention employing support columns which will fail under excessive compression loads. In FIGURE 4, seismic mass 41 in the shape of a ball is supported within case 42 by columns 43, 44, 45 and 46. Case 42 is in the form of a transparent spherical shell completely surrounding ball 41 and columns 43, 44, 45 and 46. For convenience of illustration, case 42 is shown partially cut away.

The structure of FIGURE 4 differs from the structure of FIGURE 3 in the use of support columns which fail under compressive loads rather than support lines which fail under tension loads. Columns 43, 44, 45 and 46 are attached to mass 41 and support it at the approximate center of case 42. Under excessive acceleration or shock, one or more of columns 43, 44, 45 and 46 will fail by buckling or otherwise, due to excessive compressional force.

Following the reasoning applied to the structures of FIGURES 1, 2 and 3, the magnitude of the shock or accelerating force upon mass 41 which will be required to break or deform one or more of the support columns will show only a moderate variation with the direction of the shock or acceleration. Thus, the structure of FIGURE 4 is a relatively simple detector of shock or acceleration of magnitude above a predetermined level regardless of the direction of the shock or acceleration.

Columns 43, 44, 45 and 46 of FIGURE 4 have been described as being attached to mass 41. For manufacturing convenience, or for other reasons, these columns may be attached to case 42 either in addition to or in place of their attachment to mass 41.

FIGURES 1, 2 and 3 have illustrated mechanical shock measuring devices without specifically showing surrounding cases or enclosures. In many instances it will be convenient to enclose such devices within cases which are at least in part transparent. This will allow convenient inspection of whether or not the particular shock value has been exceeded. In some instances, it may be desirable to fill the interior of the case with a liquid to damp structural vibrations or resonances.

The preceding description has referred to constraint or support wires which break at known tension values. Nonmetallic threads or other constraint elements which break or otherwise undergo irreversible changes at tensions above particular values may also be used. Other forms of force measurement, both reversible and irreversible, may also be used within the spirit of this invention. For example, the constraint wires of the structures of either FIGURE 1 or FIGURE 3 could be held to the seismic mass and/or the base points by magnetic forces. When the predetermined wire tension had been exceeded, the magnetic connection would be pulled apart. Subsequent inspection would then disclose that one or more constraint wires had been uncoupled. A device of this type could be reset when desired. Similar generalizations may be made regarding compression support elements, such as the columns shown in FIGURE 4, which are intended to buckle or otherwise undergo changes which are not directly reversible when subjected to compression loads above a predetermined value.

The description of the structure of FIGURES 1 and 2 was in terms of the measurement of a horizontal force component. It is evident that the reference to a horizontal force component was for convenience of description. Such structures may be used for the measurement of shock and acceleration in a desired plane which may be horizontal or otherwise.

The drawings have shown the use of uniformly spaced arrays of three and four support elements for the measurement of shock or acceleration in two and three dimensions respectively. In some instances, it may be desirable to use different numbers of support elements. For example, an instrument for the measurement of shock in two dimensions could be constructed on the order of FIGURE 1 except with four or more horizontal constraint wires extending out at uniformly spaced directions. An instrument for the measurement of shock in three dimensions could be constructed on the order of FIGURES 3 or 4 except with six support elements extending out in directions corresponding to the six vertices of a regular octahedron, with eight support elements extending out in directions corresponding to the eight vertices of a regular hexahedron, or with other patterns of support elements.

In some instances, it may be desirable to construct shock or acceleration measuring instruments which will be more sensitive in certain directions than in others. This may be accomplished with the structures described herein by the use of constraint wires or other support elements of non-uniform strength and/or the use of non-uniform angular spacing of the constraint wires or other support elements.

FIGURES 1, 2 and 3 have illustrated structures using only support members which are intended to fail under predetermined tension loads while FIGURE 4 has illustrated a structure in which the support members are intended to fail at predetermined compression loads. Shock and acceleration measuring instruments may also be constructed using combinations of elements which are intended to fail under excessive tension with elements which are intended to fail under excessive compression. An individual support element may or may not be used as both a tension support member and as a compression support member. Such combination instruments may or may not make use of the fact that columns will in general support greater tension loads than compression loads.

The term "fail" is used in the claims to mean deformation or change of a mechanical element which is not normally reversible. This meaning includes the breakage or irreversible stretching of tension wires and the breakage, buckling, or other irreversible transformation of columns carrying compressive loads.

What is claimed is:

1. Means for measuring mechanical acceleration including a seismic mass, an outer structure at least partially surrounding said mass, a plurality of elastic support elements each having a known elastic limit extending outward from said mass to said outer structure, said support element being in contact with said mass and said outer structure and supporting said mass in a substantially predetermined position with respect to said outer structure, said support elements being arranged to fail by exceeding said elastic limit when subjected to force in excess of a predetermined magnitude.

2. The combination as specified in claim 1 wherein said support elements are wires which are fixedly connected to said mass and said outer structure and are arranged to fail when subjected to tension in excess of a predetermined magnitude.

3. The combination as specified in claim 1 wherein said support elements are columns which are arranged to fail when subjected to compression force in excess of a predetermined magnitude.

4. The combination as specified in claim 1 wherein said support elements extend outward in directions which are substantially parallel to a common plane and spaced at substantially equal 120 degree angular intervals therein.

5. The combination as specified in claim 1 wherein said support elements extend outward in directions corresponding to the directions of the vertices of a regular polyhedron with respect to the center of said polyhedron.

References Cited by the Examiner

UNITED STATES PATENTS

| | | | |
|---|---|---|---|
| 2,666,409 | 1/1954 | Kane | 116—114.29 |
| 2,667,142 | 1/1954 | Kane | 116—114.29 |
| 2,976,732 | 3/1961 | Hautly | 73—492 |
| 3,101,069 | 8/1963 | Reich et al. | 116—114.29 |
| 3,117,455 | 1/1964 | Sheperd | 73—492 |
| 3,136,293 | 6/1964 | Schmitt | 116—114.29 |

LOUIS J. CAPOZI, *Primary Examiner.*